Sept. 20, 1966 I. J. LIEBERMAN ET AL 3,273,794

MECHANICAL BINARY DIGITAL COMPUTER

Filed Oct. 21, 1963 8 Sheets-Sheet 1

IRVING J. LIEBERMAN
WILLIAM H. DUERIG
CHARLES D. HOGAN
*INVENTORS*

BY James McShaaloty

*ATTORNEY*

MECHANICAL BINARY DIGITAL COMPUTER

Filed Oct. 21, 1963 8 Sheets-Sheet 2

IRVING J. LIEBERMAN
WILLIAM H. DUERIG
CHARLES D. HOGAN
INVENTORS

BY James McLaughlin

ATTORNEY

Sept. 20, 1966 I. J. LIEBERMAN ET AL 3,273,794

MECHANICAL BINARY DIGITAL COMPUTER

Filed Oct. 21, 1963 8 Sheets-Sheet 3

IRVING J. LIEBERMAN
WILLIAM H. DUERIG
CHARLES D. HOGAN
INVENTORS

BY James M. Shachaty

ATTORNEY

MECHANICAL BINARY DIGITAL COMPUTER

Filed Oct. 21, 1963 8 Sheets-Sheet 4

IRVING J. LIEBERMAN
WILLIAM H. DUERIG
CHARLES D. HOGAN
INVENTORS

BY James M. Shaskaty

ATTORNEY

IRVING J. LIEBERMAN
WILLIAM H. DUERIG
CHARLES D. HOGAN
*INVENTORS*

BY James M. [signature]
*ATTORNEY*

IRVING J. LIEBERMAN
WILLIAM H. DUERIG
CHARLES D. HOGAN
INVENTORS

BY James M. Shanahan [signature]
ATTORNEY

IRVING J. LIEBERMAN
WILLIAM H. DUERIG
CHARLES D. HOGAN
*INVENTORS*

BY James McShealaty
ATTORNEY

IRVING J. LIEBERMAN
WILLIAM H. DUERIG
CHARLES D. HOGAN
*INVENTORS*

BY James E. Shoshaty
ATTORNEY 3,273,794
MECHANICAL BINARY DIGITAL COMPUTER

Irving J. Lieberman, West Orange, and William H. Duerig and Charles D. Hogan, Montclair, N.J., assignors to E. S. R., Inc., Orange, N.J., a corporation of New Jersey Filed Oct. 21, 1963, Ser. No. 317,503
6 Claims. (Cl. 235—61)

This invention relates to binary digital computers and in particular to a simple, inexpensive mechanical binary digital computer.

Of late, the use of computers for making mathematical calculations has come to the fore. Large and complex computers have been devised which are capable of calculations in fractions of a second which would take years to perform if done by hand. These computers, in the main, are electrical or electronic devices. The role that mechanical computers have played has been small, due, in part, to the fact that no mechanical binary digital computer has been devised. Without the ability to use a binary code, the applications of a computer are limited, for Boolean algebra, the necessary tool for the solving of complex problems by computers requires the use of a binary system. A mechanical binary digital computer would therefore, expand the use of mechanical means in the fabrication of computers.

Moreover, the operation of any binary digital computer requires an expert knowledge of the basic functioning of computers. In the training of personnel in this regard, there has heretofore been a lack of any simple, visual device with which the operations of binary digital computers could be visually demonstrated. A mechanical binary digital computer would fill this void, since, by its very nature, motion of its parts is necessary in its use and this motion can be followed visually. Where such a computer is reduced to its bare essential parts, even the layman can follow its operation and obtain an understanding of the essential steps made by a computer in its operations.

The basic unit of any binary digital computer is the bistable element of "flip-flop," i.e., an element which has two stable positions or states to either one of which positions or states it may be driven or allowed to remain according to the calculation to be made. The driving means also known as clocking means because of its repetitive motion is directed by logic or information means as to whether to drive the bistable element to its second stable position or to allow it to remain in its first stable position. These logic or information means essentially are of two varieties referred to as "and" gates and "or" gates, the former instructing the driving or clocking means to move the bistable element only when all of two or more related contingencies exist and the latter instructing the driving or clocking means to move the bistable element when one or more of two or more contingencies exist.

In some computers, the logic or information means used are similar to the "and" and "or" gates differing only in the inputs necessary to achieve the same response. Thus, a "Nand" gate instructs a movement of the bistable element only when none of two or more contingencies exist and a "Nor" gate instructs the movement of the bistable element when one or more of two or more contingencies does not exist. The contingencies referred to are the information inherent in the calculations to be accomplished using Boolean algebra and consist of "true" and "false" contingencies. A "true" contingency is positive information to the driving or clocking means when the bistable element is in its first or "true" stable position and is negative information to the driving or clocking means when the element is in its second or "false" stable position. A "false" contingency is positive information to the driving or clocking means when the element is in its second or "false" stable position and negative information to the driving or clocking means when the element is in its first or "true" stable position. These then are the basic tools of all binary digital computers and an understanding of the functioning of such computers requires an understanding of the cooperating operation between the bistable elements and the driving means as controlled by the logic means.

For any given calculation, the bistable elements must be arranged in cooperating relationship to represent given information, each element being located in one of its stable positions or states. Logic information is then fed to the computer indicating the operations to be made on the elements. After these have been completed, the clocking or driving means is activated and in each cycle of the clocking means each element is either driven or left stationary according to the information contained in the logic input. This continues cycle after cycle until the computer has completed the directions given by the logic input. At this time, the arrangement of the bistable elements taken together represents the answer sought.

In electronic computers, these operations occur in small fractions of a second and the inputs are fed in by means of magnetic tape, punched cards or the like. In the present invention, it is proposed that all the inputs and the clocking cycling be made mechanically. Beside the obvious result of the device then constituting a mechanical computer, another salutary effect is that these operations may be visually followed by the operator to obtain a better understanding thereof.

The present invention relates to a simple, inexpensive, mechanical binary digital computer whose elements are easily visible and distinguishable, whose operation can readily be followed visually and whose inputs are mechanical. In its broadest terms, the invention comprises a plurality of bistable elements, each such bistable element having set means having a first position and a second position, reset means having a first position and a second position, logic means, mechanically connected to said bistable elements adapted to control the positions of said set means and said reset means, and driving means adapted to move said bistable element to its second stable position when said set means is in its first position and to move said bistable element to its first stable position when said reset means is in its first position and to allow said bistable element to remain unmoved from its stable position when both said set means and said reset means are in their respective second position.

It is therefore an object of this invention to provide a mechanical binary digital computer.

Another object of this invention is to provide a simple, inexpensive mechanical binary digital computer.

It is a further object of this invention to provide a mechanical binary digital computer whose elements are easily visible and distinguishable and whose operation can readily be followed visually.

It is another object of this invention to provide a mechanical binary digital computer whose inputs may be manually manipulated.

It is another object of this invention to provide a mechanical binary digital computer whose clocking or driving means may be manually operated.

It is still another object of this invention to provide a mechanical computer wherein the set and reset means of the logic input are automatically operated according to the logic input as an integral part of the cycling of the clocking means.

These and other objects, features and advantages of the present invention will become more apparent from the following detailed description taken together with the accompanying drawings, in which.

Figure 1:
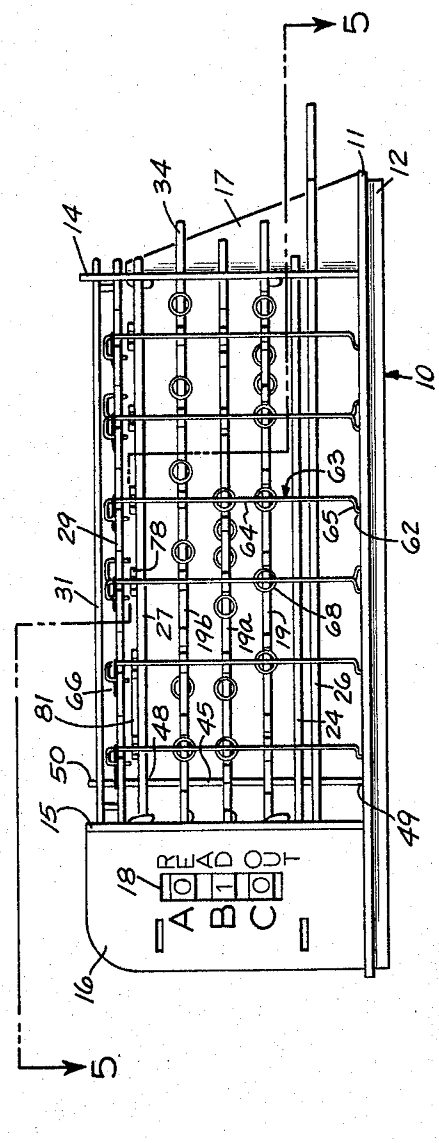
FIGURE 1 is a frontal elevation view of a preferred embodiment of the invention.
Figure 3:
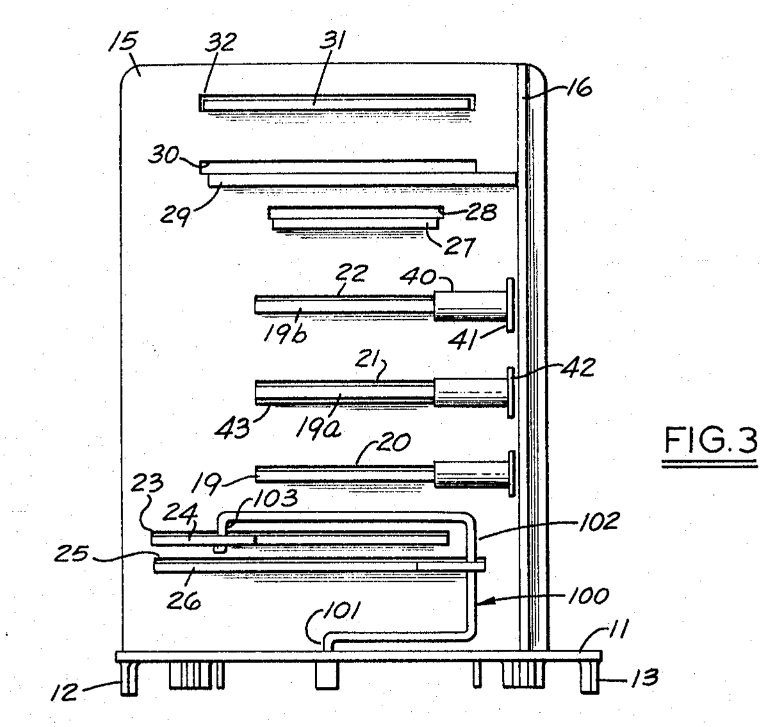
FIGURE 3 is a side elevational view of the preferred embodiment of the invention viewed from the right.
Figure 2:
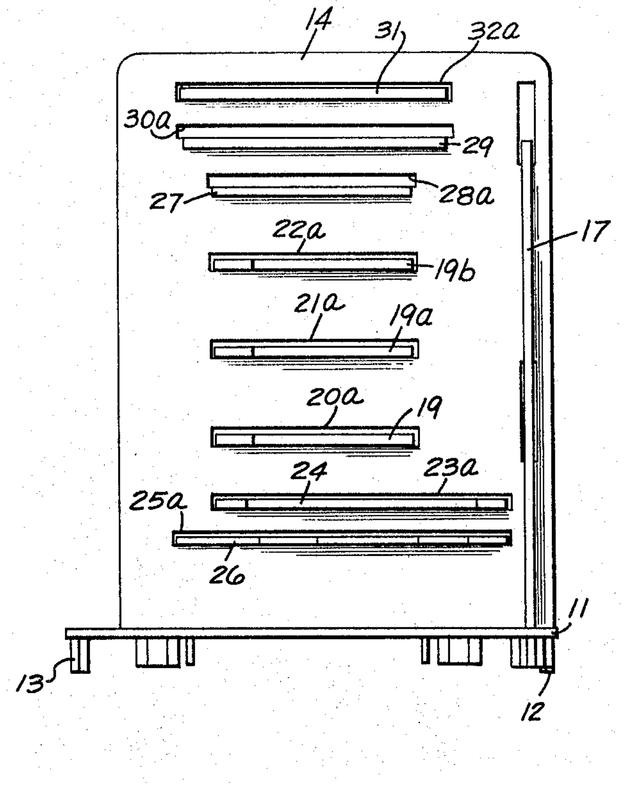
FIGURE 2 is a side elevational view of the preferred embodiment of the invention viewed from the left.
Figure 4:
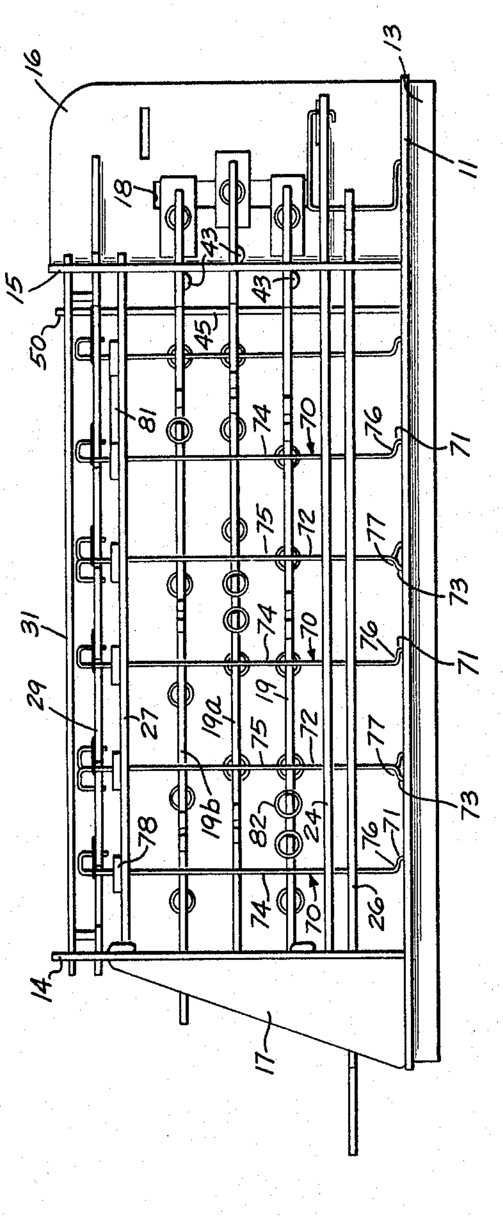
FIGURE 4 is a rear elevational view of the preferred embodiment of the invention.
Figure 5:
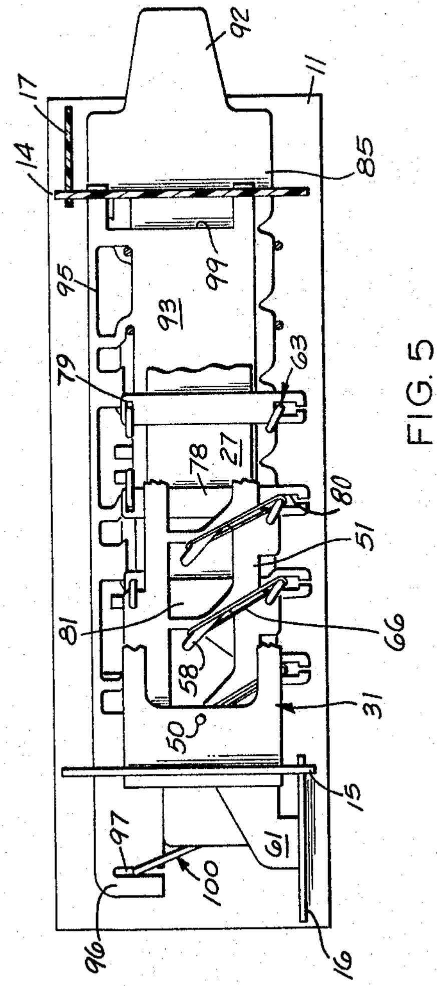
FIGURE 5 is a top view of the preferred embodiment of the invention partially in section viewed along line 5—5 in FIGURE 1.
Figure 7:
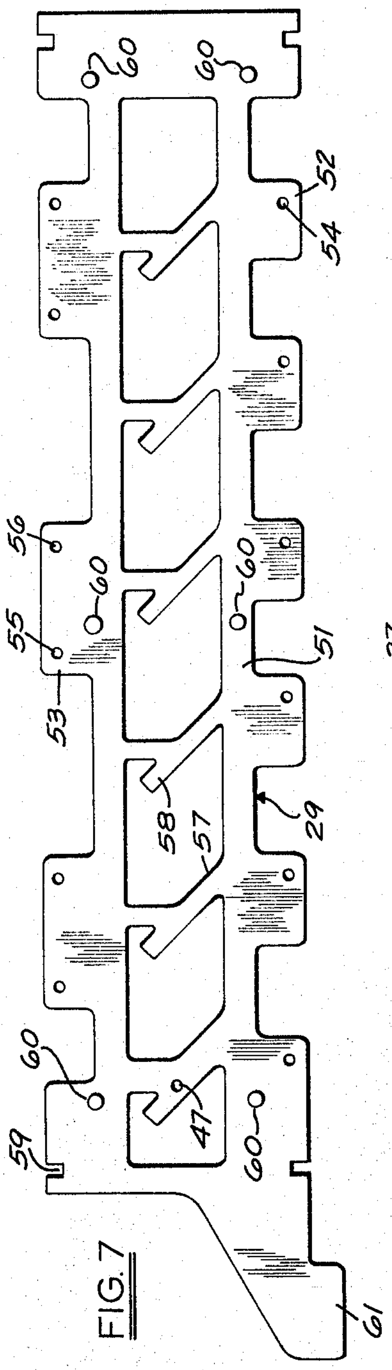
FIGURE 7 is a drawing of the bearing plane of the preferred embodiment of the invention.

Referring to the drawings, the preferred embodiment comprises a styrene plastic base 10 having a horizontal plate portion 11 and vertical wall sections 12 and 13. Attached vertically to horizontal plate portion 11 are side sections 14 and 15. Also attached vertically to horizontal plate portion 11 but at righ angles to side section 15 and attached to it is readout face plate 16. In like manner, vertical support section 17 is perpendicular to side section 14 and attached to it. Side sections 14 and 15, readout face plate 16 and vertical support section 17 are attached to horizontal plate portion 11 and to each other such that they can easily be assembled or disassembled.

A cutout 18 in readout face plate 16 serves as a window through which the answer or information signified by the positions of flip-flops or bistable elements 19, **19*a* and 19*b* can be read. Horizontal slots 20, 21 and 22 in vertical section 15 and horizontal slots 20*a*, 21*a* and 22*a* in vertical section 14 act as supports for flip-flops 19, 19*a* and 19*b* allowing the latter to freely slide through said slots 20, 20*a*, 21, 21*a*, 22 and 22*a* only in a horizontal plane in a direction parallel to the plane of readout face plate 16. In like manner, slots 23 and 23*a* act as supports for reset plane 24, allowing it to move through said slots 23 and 23*a* only in a horizontal plane in a direction parallel to the plane of readout face plate 16 and slots 25 and 25*a* act as supports for clear and set plane 26, allowing it to slide only in a horizontal plane in a direction parallel to the plane of readout face plate 16. Slide plane 27 is fixedly supported in slots 28 and 28*a*, bearing plane 29 is fixedly supported in slots 30 and 30*a*, and rod retaining plane 31 is fixedly supported in slots 32 and 32*a***.

Figure 6:
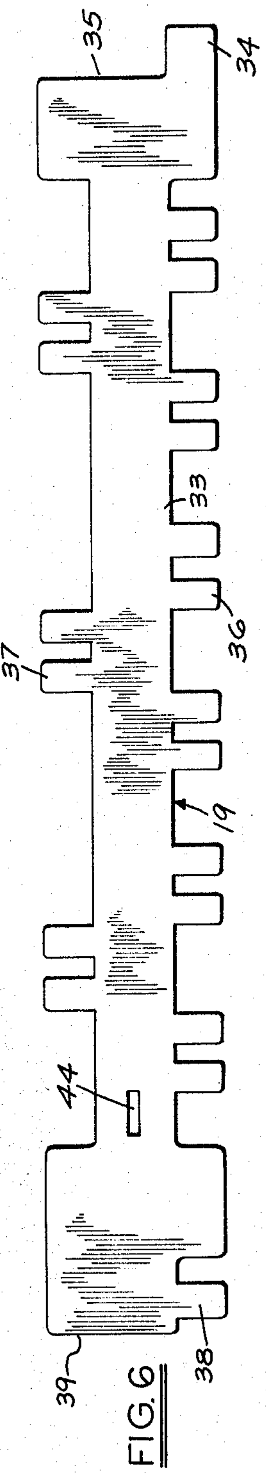
FIGURE 6 is a drawing of a typical flip-flop of the preferred embodiment of the invention.
Figure 8:
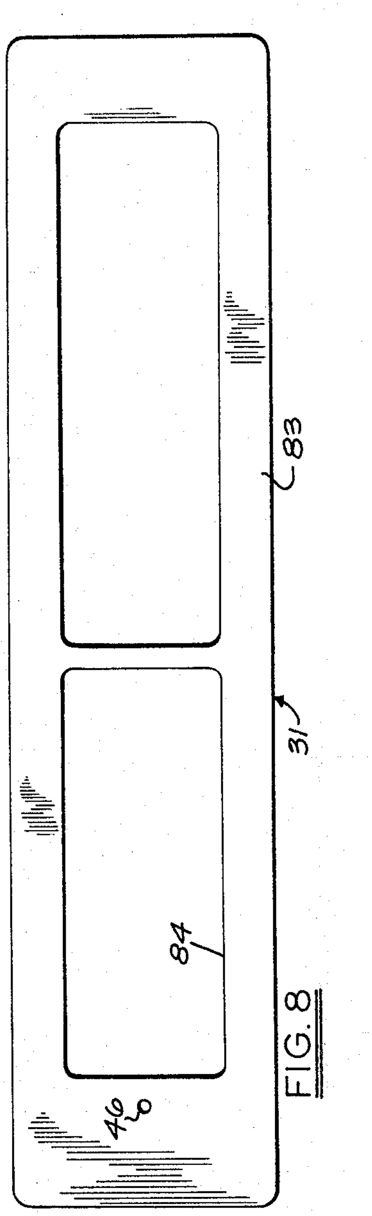
FIGURE 8 is a drawing of the rod retaining plane of the preferred embodiment of the invention.

Referring now to FIGURE 6, typical flip-flop 19, made of styrene plastic, comprises a flat place portion 33 having a tab portion 34 at one end 35 of its length. Tabs 36, arranged in pairs extend from one side and tabs 37, also arranged in pairs extend from the opposite side. The functions of tabs 36 and 37 will be more fully set forth hereinafter. A readout tab 38, extending from the same side as tabs 36, is located at the second end 39.

As assembled, plug 40, a short styrene plastic tube, is slipped over tab 38 thereby being fixedly attached since the inside diameter of plug 40 is less than the width of tab 38. At the other end of plug 40 is inserted, and fixedly attached in like manner a T-shaped styrene plastic head 41 having a flat surface 42 upon which are located the numerals "0" and "1" reading from left to right. These numerals are spatially disposed with relation to cutout 18 of readout face plate 16 so that only the numeral "0" is observed through cutout 18 when the flip-flop 19 is in its stable position to the right and only the numeral "1" is observed through the cutout 18 when the flip-flop 19 is in its stable position to the left. These two stable positions of the flip-flop 19 are determined by boss 43 located on the underside of the flip-flop. When boss 43 is to the left side of side section 15, the flip-flop is in its left stable position and when boss 43 is to the right of side section 15, flip-flop 19 is in its right stable position. The stability of these two positions results from the pull of gravity upon the flip-flop 19 which will not allow boss 43 to slide through slot 20 unless an external force is applied and from slot 44 through which limit pin 45 is located which prohibits flip-flop 19 from any motion except that causing boss 43 to slide through slot 20. Limit pin 45 is supported in hole 46 in rod retaining plate 31, in hole 47 of bearing plate 29, in hole 48 of slide plane 27 and in hole 49 of base 10 by means of gravity, the top 50 of limit pin 45 peened to prohibit travel of limit pin 45 through hole 46.

Bearing plane 29 comprises a flat styrene plastic plate 51 having tabs 52 extending from one side and tabs 53 extending from the opposite side. Located in each tab 52 is a hole 54 and located in each tab 53 are two holes 55 and 56. Six central cutouts 57 in the plate 51 form six anchors 58 whose purpose is set forth more fully hereinafter. Four notches 59 at the ends of plate 51 are used to anchor plate 51 to side sections 14 and 15 through slots 30 and **30*a*. Six pins 60 extend upward from plate 51 at the locations indicated and extending from the left end of plate 51 is foot section 61**.

As assembled, bearing plane 29 is spatially disposed in a plane parallel but at a higher level to the planes of flip-flops 19, **19*a* and 19*b*. As mentioned before, bearing plane 29 is held fixedly in notches 30 and 30*a*, the walls of side sections 14 and 15 protruding into notches 59. Foot section 61 rests against the rear of readout face plate 16, providing one means of horizontal support therefor. Holes 54, together with holes 62 located in base 10, which latter are spatially disposed in cooperative relationship with holes 54, serve as bearing surfaces for six vertical rods 63, which are rotatably mounted therein, each such rod 63 being mounted in a related pair of holes 62 and 54. Each rod 63 is an off center rod having a vertical length 64 disposed a distance away from its axis of rotation which is defined by the straight line between the hole 62 and the hole 54 within which it is mounted. Horizontal portion 65 of rod 63 acts as a seat resting upon base plate 10 to probihit any downward motion of rod 63, which is held in place by gravity. Each rod 63 is spatially disposed in cooperative relationship with a pair of tabs 36 on each flip-flop 19, 19*a* and 19*b*, such that rod 63 is opposite one tab 36 of said pair of tabs when typical flip-flop 19 is in one of its stable positions and opposite the other tab 36 of said pair of tabs when flip-flop 19 is in the second of its stable positions. Rod 63 is continually urged toward said tabs 36 by means of elastic band 66 which loops around anchor 58 and vertical length 64 of rod 63. By the same means, rod 63 is continually urged against the front edge 67 of clear and set plane 26**.

As part of the inputs to the computer, removable plugs 68 are arranged on tabs 36 according to the operation desired as will be more explicitly set forth hereinafter. Plugs 68 are short hollow tubes of styrene plastic and fit on tabs 36 in the same manner as plug 40 is supported on tab 38. The forward ends of plugs 68 when mounted, extend slightly less forward toward rods 63 than the most forward portion of edge 67 of clear and set plane 26 while the forward edges of tabs 36 extend less forward than the deepest point of recess 69 in clear and set plane 26. Hence, the vertical length 64 of vertical rods 63 is always in touch with either the front edge 67 of clear and set plane 26 or with the forward edge of plugs 68 during any and all horizontal motions of clear and set plane 26, providing that a plug 68 is located opposite any portion of vertical length 64. The absence of any plug 68 opposite any vertical length 64 of rods 63 allows that rod to rotate into the recess 69 of clear and set plane 26 upon horizontal motion of the latter while the presence of any plug 68 opposite any vertical length 64 of rods 63 keeps that rod from rotating into recess 69 during horizontal motion of clear and set plane 26.

At the rear of the preferred embodiment, set rods 70 are rotatably mounted in bearing holes 56 in bearing plane 29 and bearing holes 71 in base 10 and reset rods 72 are rotatably mounted in bearing holes 55 in bearing plate 29 and bearing holes 73 in base 10. Set rods 70 and reset rods 72 are identical in construction to vertical rods 63, having vertical lengths 74 and 75 respectively which are removed from the axis of rotation of rods 70 and 72 and being vertically supported by the seating of horizontal sections 76 and 77 respectively on the upper surface of base 10. In their relaxed positions set rods 70 are in their most clockwise positions when viewed from the top and reset rods 72 are in their most counterclockwise positions when so viewed.

Commencing with extreme right vertical rod 63, alternate vertical rods 63 are connected to set rods 70 and the remaining vertical rods are connected to reset rods 72 each by means of typical slider 78. Slider 78 is a plastic styrene plate having a slot 79 at one end through which set rod 70 or reset rod 72 are positioned and a notch 80 in which vertical rod 63 is positioned. The minimum dimensions of slot 79 and notch 80 are greater than the diameter of vertical rods 63, set rods 70 and reset rods 72, allowing these rods to rotate freely within the notches 80 and slots 79. As can be seen, any rearward motion of vertical length 64 of vertical rods 63 as they rotate into recess 69 upon horizontal motion of clear and set plane 26 is transmitted through the slider 78 to the set rod 70 or reset rod 72 with which it is cooperatively disposed.

An "or" gate is obtained when two vertical rods 63 are connected to a single set rod 70 or reset rod 72 by means of dualfingered slider 81, having two notches 80 at one end and only one slot 79 at the other end, giving it a "Y" shaped configuration. In this manner, the backward motion of either or both of the vertical rods 63 is transmitted to the set rod 70 or reset rod 72 to which they are connected through slider 81. It is obvious that any number of vertical rods 63 may be connected to a single set rod 70 or reset rod 72 in this manner so as to provide an "or" gate governed by any number of contingencies.

The relative positioning of set rods 70, reset rods 72 and tabs 37 of flip-flops 19, **19*a* and 19*b* is typically such that when flip-flop 19 is in its stable position to the right any given pair of tabs 37 is located immediately to the left of their respective set rod 70 and when flip-flop 19 is in its stable position to the left, any given pair of tabs 37 is located immediately to the right of their respective reset rod 72. As a further part of the logic input into the computer, removable plugs 82 are mounted on tabs 37 in the arrangement required for the particular operation to be performed. Plugs 82 are short plastic styrene tubes and are mounted on tabs 37 in like manner to the mounting of plugs 68 on tabs 36. When mounted, plugs 82 extend further to the rear than the most rearward position of set rods 70 and reset rods 72**.

The rod retaining plane 31 comprises a flat rectangular styrene plastic plate 83 having two central cutouts 84 and a hole 46. As assembled, it is supported in slots 32 and **32*a* and rest upon pins 60 of bearing plate 29. Limit pin 45, inserted through hole 46 restrains rod retaining plane 31 from any horizontal movement. The vertical distance between the top surface of bearing plate 29 and the bottom surface of rod retaining plate 31 is sufficiently small, as compared to the supporting legs of vertical rods 63, set rods 70 and reset rods 72, so that vertical rods 63, set rods 70 and reset rods 72 are restrained from popping out of bearing holes 54, 55 and 56 of bearing plate 29**, and yet is sufficiently large to allow said rods to rotate freely.

The clocking mechanism of the preferred embodiment comprises clear and set plane 26 and reset plane 24. Clear and set plane 26 is a generally flat rectangular styrene plastic plate 85 having recesses 69 along one lateral side and three identical sets of cutouts 86 and 87 at the other side. One end of plate 85 forms a tab section 89 having a notch 90. Toward the same end is located slot 91 through which limit pin 45 is positioned, acting as a stop, limiting the horizontal movement of clear and set plane 26. The other end of plate 85, is in the form of a triangular tab 92 which is pushed and pulled in order to operate the computer as will be more specifically set forth herein. Plane 26 is slidably supported in slots 25 and **25*a*** when assembled.

Reset plane 24 is a generally rectangular styrene plastic plate 93 having three sets of identical pairs of cutouts 94 and 95 which are reversed images of cutouts 86 and 87 in clear and set plane 26. One end of plate 93 extends in a tab section 96 having a notch 97 located therein. Toward that same end of plate 93 is located slot 98 through which limit pin 45 is positioned acting as a stop, limiting the horizontal movement of reset plane 24, which is slidably mounted in slots 23 and **23*a*. The other end of plate 93 has a centrally located large notch 99 located therein allowing plane 24 to be continually supported within slots 23 and 23*a* and yet not interfere with the manual manipulation of clear and set plane 26. A sickle-shaped connecting rod 100, rotating within bearing hole 101 of base 10 has its central vertical leg 102 positioned in notch 97 of reset plane 24 and its outer vertical leg 103 positioned in notch 90 of clear and set plane 26. As is obvious to one skilled in the art, this causes the horizontal motion of clear and set plane 26 to always be in the direction opposite to the direction of the horizontal movement of reset plane 24**.

In operating the computer, the information to be operated upon is placed into the computer by manually setting the flip-flops 19, **19*a* and 19*b* so that the readout registering at the cutout 18 of the readout face plate 16 represents the information. Next, the operator must determine which tabs 36 are to have plugs 68 mounted thereon according to the operation required. This is determined by the use of Boolean algebra. Of each pair of tabs 36, the left tab is the "true" contingency position and the right tab is the "false" contingency position for the vertical rod 63 stationed opposite them. Since the motion of the vertical rods 63 are transmitted to the set rods 70 and the reset rods 72, these "true" and "false" contingency positions apply to the set rod 70 or the reset rod 72 to which the vertical rod 63 is connected. Where a "true" contingency with respect to a vertical rod 63 is to be registered, a plug 68 is mounted on the "true" tab 36 opposite it and no plug is mounted on the "false" tab opposite it. Where a "false" contingency is to be registered, a plug 68 is mounted on the "false" tab 36 opposite it and no plug is mounted on the "true" tab opposite it. In determining the positions of plugs 68, the positions of plugs 82 on tabs 37 must also be considered so that any 'true" contingency registration indicating a setting or resetting of a particular flip-flop is applied only to that particular flip-flop. Plugs 82 must be mounted on tabs 37 on the flip-flop to which one or more vertical rods 63, as a gate, have been assigned, on the tab 37 immediately to the left of the set rod 70 to which the vertical rod or rods 63 is or are connected or on the tab 37 immediately to the right of the reset rod 72 to which the vertical rod or rods 63 is or are connected. The mounting of plugs 68 and 82 is made simply by pushing them on tabs 36 and 37, rotating the rods 63, 70 or 72** out of the way where the need arises and returning the rods to their proper positions after mounting.

Figures 9A, 9B, 9C, 9D:
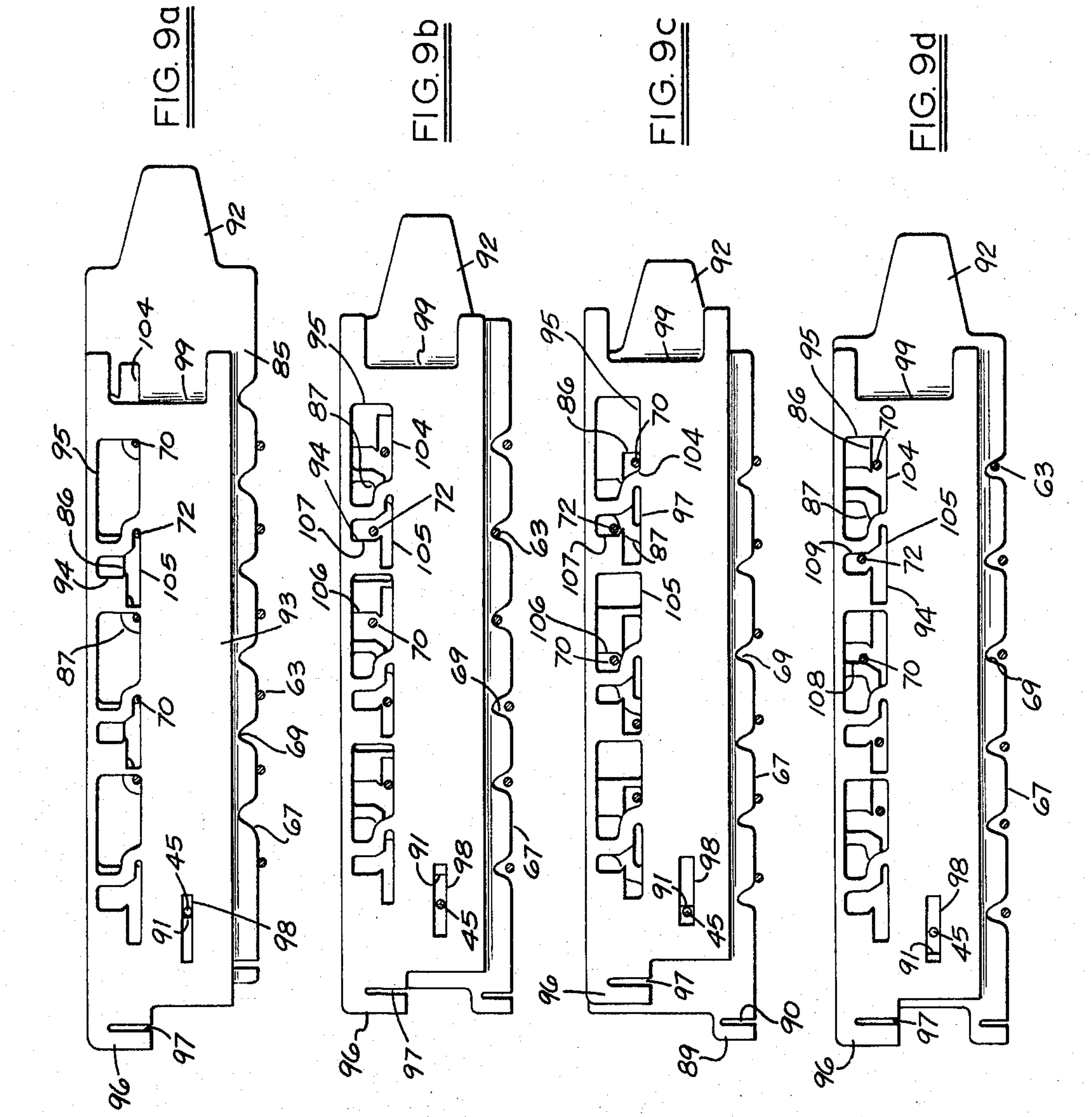
FIGURES 9 (*a–d*) are drawings showing the spatial relationship between the reset plane, the clear and reset plane, the set rods and the reset rods of the preferred embodiment of the invention through a cycle of the clocking means.

When all the inputs have been made, the computer is ready to perform the operation desired. The operator then grasps the reset plane 24 at tab 99 and pulls it to its extreme right position. At this point all vertical rods 63 are in contact with front edge 67 of clear and set plane 26, all set rods 70 are in contact with edge 104 of cutout 86 in clear and set plane 26, being positioned through both cutout 86 and cutout 95 of plane 24 as shown in FIGURE 9*a*. Similarly, all reset rods 72 are in contact with edge 105 of cutout 94 of reset plane 24, being positioned through both cutout 94 and cutout 87 of plane 26. Next, the operator pushes tab 92 toward the left. As this occurs, vertical rods 63 remain in contact with front edge 67 of clear and set plane 26 because of the spring force of elastic bands 66. As the motion continues, each vertical rod 63 either continues in contact with front edge 67 into its respective recess 69 if no plug 68 is mounted on any tab 36 opposite the vertical bar 63 or comes in contact with the forward end of a plug 68 mounted opposite it, in which case its motion ceases. If the vertical rod 63 continues into its recess 69, its motion is transmitted through slider 78 to the set rod 70 or reset rod 72 to which it is connected as shown in FIGURE 9*b*. The set rod 70 and reset rod 72 are now in a position where the continued motion of clear and set plane 26 and reset plane 24 will cause edge 106 of cutout 86 to contact set rod 70 and push it towards the left and edge 107 of cutout 94 to contact reset rod 72 and push it toward the right, until both plane 26 and plane 24 have proceeded to their extreme left and right positions respectively as limited by limit pin 45, which is shown in FIGURE 9*c*. The clocking mechanism is designed so that the pushing force is not applied until front edge 67 has returned all vertical rods 63 to their most forward position beyond the forward end of plugs 68, thereby allowing the flip-flops to be moved even though a plug 68 will thereby be moved passed a vertical rod 63.

The motion of set rod 70 to the left forces it against any plug 82 located immediately toward its left, therby moving the flip-flop upon which plug 82 is mounted to its left stable position, boss 43 being forced to slide through its respective slot in side section 15. Likewise, the motion of reset rod 72 to the right forces it against any plug 82 located immediately toward its right, thereby moving the flip-flop upon which plug 82 is mounted to its right stable position.

The operator then proceeds to pull tab 92 to the right. As shown in FIGURE 9*d* this causes edge 108 of cutout 86 and edge 109 of cutout 94 to make contact with set rod 70 and reset rod 72 respectively and force them to their original positions as shown in FIGURE 9*a*.

After the operation has been performed, the answer, in code, appears at the cutout 18 of readout face plate 16. If the operation desired has been designed to be completed in more than one step, the clocking mechanism is moved as before for the required number of times until the operation is complete, the intermediate results appearing at the cutout 18 after each step. It is in this respect that the educational value of the invention can best be appreciated, since the operation can be followed visually step by step and interrupted when necessary to give the observer a better understanding of what is occurring.

In the drawings, the preferred embodiment has been shown programmed to count from one to four. As can be seen from the drawings, the manual setting of all the flip-flops to "0" or their right stable positions would leave plugs 68 opposite all vertical rods 63 except the extreme right vertical rod 63. Hence the first cycle of the clocking mechanism would cause the extreme right set rod 70 to move flip-flop 19 to its left stable position, indicating a binary readout of the number 1. In this posture, both the second and third most right vertical rods 63 would have no plugs 68 opposite them and the next cycle of the clocking mechanism would cause the extreme right reset rod 72 to move flip-flop 19 back to its right stable or "0" position and would cause the second most right set rod 70 to move flip-flop 19*a* to its left stable or "1" position, indicating, in binary code, the number 2.

Now only the extreme right vertical rod 63 has no plug 68 opposite it and the next cycle of the clocking mechanism will cause the extreme right set rod 70 to move flip-flop 19 to its left stable or "1" position. As a result the binary readout is "1" for flip-flop 19*a* and "1" for flip-flop 19, indicating the number 3.

At this point, the second, fourth and fifth vertical rods 63 from the right have no plugs 68 opposite them. Consequently, in the next cycle of the clocking mechanism the extreme right reset rod 72 will move flip-flop 19 back to its right stable or "0" position, the second most right reset rod 72 will move flip-flop 19*a* to its right stable or "0" position and the third most right set rod 70 will move flip-flop 19*b* to its left stable or "1" position, the binary readout then being the number 4.

As already pointed out, the preferred embodiment comprises 3 flip-flop and an "or" gate. The vertical rods 63 together with the use of plugs 68 on tabs 36 constitute "and" gates since all of the vertical row of tabs 36 opposite a particular vertical rod 63 must be free of plugs 68 in order that that particular vertical rod may signal a change in the position of its respective flip-flop. If any one or more of tabs 36 in the vertical row opposite a particular vertical rod 63 has a plug 68 position thereon, the vertical rod 63 is not allowed to signal any change in the position of its respective flip-flop and, in terms of computer operation, there is no signal. It is obvious that the number of flip-flops can easily be increased to allow the number of contingencies included in the "and" gate to be increased.

Referring now to the flip-flops of the preferred embodiment, the stable position of each flip-flop to the left is taken as its "true" position and that to the right, its "false" position. In its "true" position the right tabs of each pair of tabs 36 of the flip-flop are stationed opposite the vertical rods 63. In its "false" position the left tab of each pair of tabs 36 are stationed opposite the vertical rods 63. When a "true" signal is desired, i.e., when an output signal is desired only while the flip-flop is in its "true" position, a plug 68 is mounted on the left or "true" tab of the pair of tabs 36 opposite the vertical rod 63 which is to receive the signal. In this manner the vertical rod 63 will encounter no barrier from the flip-flop when it is in its "true" or lift position but will come in contact with the plug 68 on the "true" tab 36 when the flip-flop is in its "false" or right position. Such an input would be a "true" signal input. In like manner, when a "false" signal is desired, i.e., when an output is desired only when the flip-flop is in its "false" or right stable position, a plug 68 is mounted upon the right or "false" tab of the pair of tabs 36 opposite the particular vertical rod 63 which is to receive the signal.

Hence, the preferred embodiment comprises all the elements of any binary digital computer—flip-flops, "or" gates, "and" gates, logic or information means indicating "true" and "false" input signal and clocking or driving means to drive the flip-flops according to the instructions of the input information means. It therefore is capable of performing any of the basic operations of a binary digital computer. Of course, the preferred embodiment is limited in scope as to the amount of numbers or information it can handle, it being limited in size and number of components. But the invention herein encompasses larger units with more elements and with a greater number of input information means and output means.

The preferred embodiment utilizes manual inputs and manual driving means. However, as is obvious to those skilled in the art, the driving means could easily be made power driven and the input means could be made mechanically by the use of punched cards, punched tape or the like. In this manner, a totally mechanical computer could be fabricated utilizing the invention herein.

Figure 10:
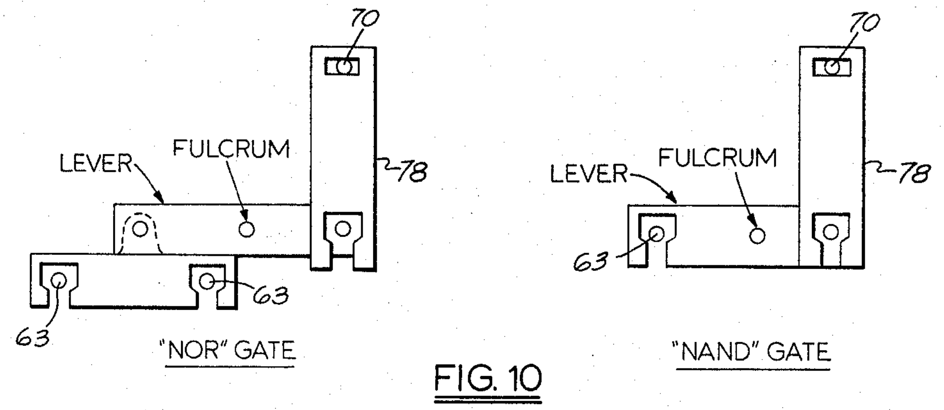
FIGURE 10 is a drawing showing the conversion of an "and" gate of the preferred embodiment to a "Nand" gate and an "or" gate to an "Nor" gate.

If it is desired to utilize "Nand" gates and "Nor" gates rather than "and" and "or" gates in the computer, the use of levers as shown in FIGURE 10 converts an "and" gate into a "Nand" gate and an "or" gate into a "Nor" gate. Obviously, the levers would cause the motion of vertical rods 63 to be transmitted to set rods 70 and reset rods 72 in the opposite sense as when the levers are not utilized and consequently, the various inputs necessary for positive outputs are reversed. Thus, in one simple step, the conversion is complete.

Figure 11:
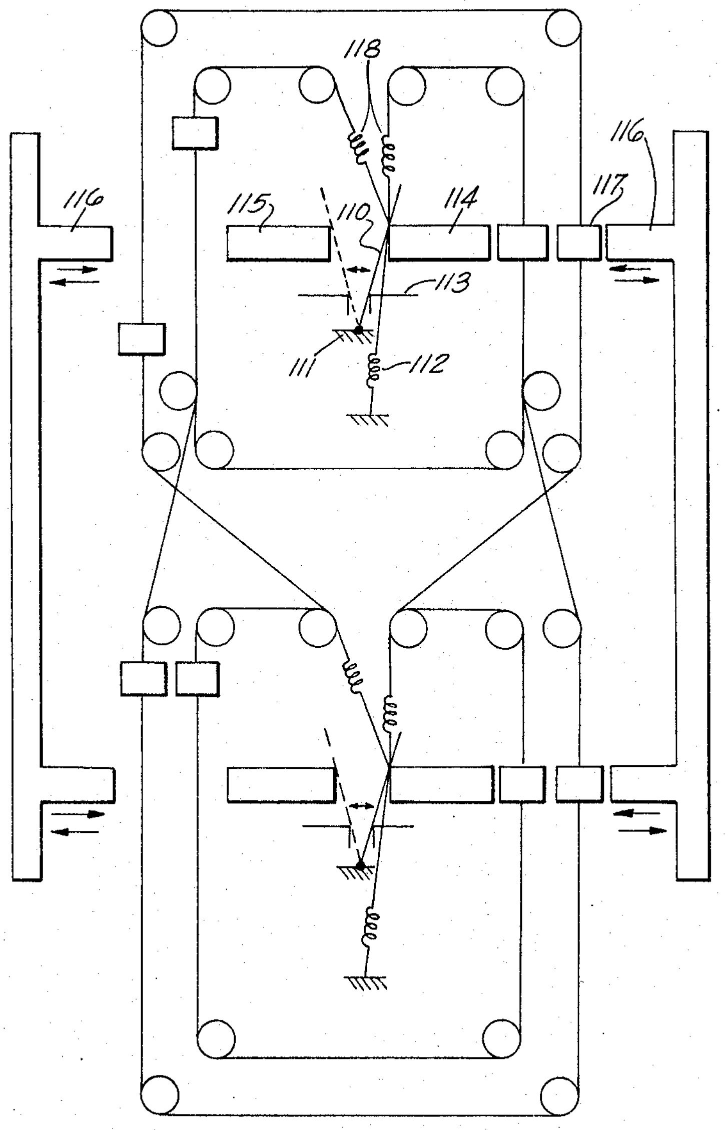
FIGURE 11 is a schematic drawing of a second embodiment of the invention.

The preferred embodiment hereinbefore described embodies the invention in terms of planar flip-flops, rod set and reset means and tab and plug information means. The invention herein, however, contemplates the use of any mechanical flip-flop driven by mechanical means according to binary digital mechanical information. For example, the invention may be embodied in a device as shown schematically in FIGURE 11. In such a device, the flip-flop comprises a rod 110 rotatably mounted on a fixed surface 111. The two stable positions of the flip-flop are determined by the off-center spring 112 which fixed surface 111. The two stable positions of the flip-urges rod 110 against either of stops 113 depending upon which stable position the flip-flop is in. Movement of the flip-flop from one stable position to the other is made by movement of set rod 114 and reset rod 115. The movement of set rod 114 and reset rod 115 in turn is controlled by clocking means 116, which, if interference blocks 117 are all in line with set rod 114 or reset rod 115, will drive either set rod 114 to the left or reset rod 115 to the right.

In this embodiment, interference blocks 117 constitute the information input means. As are the tabs in the preferred embodiment, these information means are connected to the flip-flops and follow, as can readily be seen, the motion of the flip-flops. The springs 118 allow the flip-flops to be moved without the immediate motion of the interference blocks 117 connected to it, which are held in place by friction during the pushing stage, but, as soon as the clocking means has completed its forward motion and begins to return, the interference blocks 117 will immediately snap into their proper positions.

As already stated, if all the interference blocks 117 are line up opposite set rod 114 or reset rod 115, the motion of the clocking means will cause the set rod 114 or reset rod 115 to move, pushing the flip-flop past its central position and into its other stable positions. If all of a set of interference blocks 117 are not properly aligned, the motion of the clocking means is not transmitted to the set rod 114 or the reset rod 115 and no movement of the flip-flop ensues. This, then, constitutes an "and" gate.

By utilizing the method described in reference to the preferred embodiment, "or" gates, "Nand" gates and "Nor" gates can be fabricated and arranged in a computer operating with rod flip-flops and interference block information means.

Figure 12:
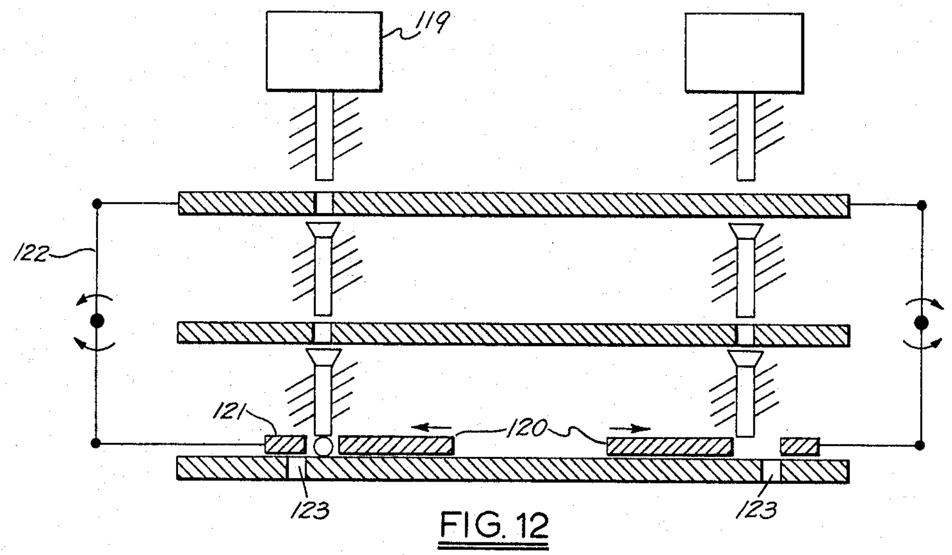
FIGURE 12 is a schematic drawing of a third embodiment of the invention.

Another device embodying the invention is shown schematically in FIGURE 12. In this device, the flip-flops are similar to those in the preferred embodiment, being planar in form. The information means, however, comprise hollow tubes and spherical pellets in conjunction with holes through the flip-flop planes. A reservoir of pellets 119, from which one pellet is allowed to escape for each cycle of the clocking means is located at the top of each gate of the device. As the pellet falls, it passes through the stationary tubes and the holes located in the flip-flop planes and falls in front of the clocking rod 120, between it and the set rod 121. The motion of the clocking rod 120 is then transmitted through the pellet to the set rod 121, through the linkage 122 to the flip-flop. During the return motion of the clocking rod 120, the pellet falls through a hole 123 and travels to a tray, not shown, from which the supply of reservoir 119 is replenished. If the downward motion of the pellet is interrupted because there is no hole through the flip-flop plane, the pellet rolls off the flip-flop plane and into the tray referred to above. The motion of the clocking mechanism is such that the clocking rod 120 moves only after sufficient time has elapsed after the release of the pellet from the reservoir to enable the pellet to fall its complete travel distance.

Again, it can readily be seen that "and," "or," "Nand" and "Nor" gates can easily be fabricated and assembled into computers by utilizing the methods already described. An "or" gate would comprise a "Y" shaped tube below the bottom flip-flop having any desired number of incoming channels.

Although the invention has been herein shown and described in what is conceived to be the most practical and preferred embodiments, it is recognized that departures may be made therefrom within the scope of the invention limited to the details disclosed herein but is to be accorded the full scope of the claims so as to embrace any and all equivalent structures.

What is claimed is:

1. A mechanical binary digital computer comprising at least one flat generally rectangular plate having a first stable position and a second stable position; set means, having a first set position and a second set position; reset means, having a first reset position and a second reset position; two pairs of logic tabs extending from a lateral edge of said plate; at least two rotatably mounted rods, each said rod disposed in cooperative relationship with one of said two pairs of logic tabs, so as to be opposite the first logic tab of its respective said pair of logic tabs when said plate is in said first stable position and opposite the second logic tab of said respective pair of logic tabs when said plate is in said second stable position; spring means, continually urging said rods toward said respective logic tab opposite each said rod; hollow tubes, mounted on one logic tab of each said pair of logic tabs, extending from said plate beyond said logic tab; clocking means, adapted to rotate said rods away from said plate beyond said hollow tubes when said plate is being driven from said first stable position to said second stable position and from said second stable position to said first stable position and allowing said rods to rotate toward said respective logic tabs opposite each said rod when said plate is not being driven; and driving means, adapted to drive said plate from said first stable position to said second stable position when said set means is in said first set position and to drive said plate from said second stable position to said first stable position when said reset means is in said first reset position.

2. A mechanical binary digital computer comprising at least one flat generally rectangular bi-stable plate, having a first stable position and a second stable position; at least two pairs of logic tabs extending from one lateral edge of said plate; at least one set tab, extending from the opposite lateral edge of said plate; at least one reset tab extending from said opposite lateral edge of said plate; at least two rotatably mounted first rods, each said first rod disposed in cooperative relationship with one pair of said two pairs of logic tabs, so as to be opposite the first logic tab of its respective said pair of logic tabs when said plate is in said first stable position and opposite the second logic tab of said respective pair of logic tabs when said plate is in said second stable position; spring means, continually urging each said first rod toward said respective logic tab opposite said first rod; hollow logic tubes, mounted on one logic tab of each said pair of logic tabs having their outermost edge extending from said plate beyond said logic tab; a set rod, rotatably mounted and disposed in cooperative relationship with said set tab to the side of said set tab, having a first set position and a second set position; connecting means, connecting said set rod to one of said first rods and adapted to that rotation of said first rod toward said plate to said outermost edge of said logic tube mounted upon said logic tab will allow said set rod to remain in said first set position and rotation of said one of said first rods toward said plate to said logic tab will cause said set rod to rotate to said second set position; a reset rod, rotatably mounted and disposed in cooperative relationship with said reset tab to the side of said reset tab, having a first reset position and a second reset position; connecting means, connecting said reset rod to the other of said first rods and adapted so that rotation of said other first rod toward said plate to said outermost edge of said logic tube mounted upon said logic tab will allow said reset rod to remain in said first reset position and rotation of said other of said first rods toward said plate to said logic tab will cause said reset rod to rotate to said second reset position; retaining means, adapted to retain said set rod in said first set position whenever said set rod is not in said second set position nor being driven to said second set position and to retain said reset rod in said first reset position whenever said reset rod is not in said second reset position nor being driven to said second reset position; driving means, adapted to drive said set rod against said set tab when said set rod is in said second set position, thereby driving said plate from said first stable position to said second stable position, and to drive said reset rod against said reset tab when said reset rod is in said second reset position, thereby driving said plate from said second stable position to said first stable position; and clocking means, adapted to rotate said first rods away from said plate beyond said outermost edge of said logic tubes when said plate is being driven from said first stable position to said sescond stable position, and from said second stable position to said first stable position, and allowing said first rods to rotate toward said plate toward said respective logic tab opposite each said first rod when said plate is not being driven.

3. In a mechanical binary digital computer, an "and" gate comprising at least two plates disposed spatially in parallel planes of one another, each said plate having a "true" output stable position and a "false" output stable position spatially disposed from said "true" output stable position; a set rod spatially disposed opposite said plates, having a first set position and a second set position rotatably disposed from said first set position; and mechanical logic means, adapted to drive said set means to said first set position only when all said plates are in their said respective "true" output stable positions.

4. In a mechanical binary digital computer, an "and" gate as in claim 3 wherein said logic means comprise a first rod disposed opposite said plates; logic tabs, extending from each said plate and adapted to restrain said first rod from motion toward said plates when any one or more of said plates is in its said "false" output position; spring means, continually urging said first rod toward said plates; and connecting means, connecting said first rod to said set rod and adapted to drive said set rod to said first set position when said first rod is not restrained by said logic tabs from motion toward said plates.

5. In a mechanical binary digital computer, an "or" gate comprising at least two plates disposed spatially in parallel planes of one another, each said plate having a "true" output stable position and a "false" output stable position spatially disposed from said true output stable position; a set rod, spatially disposed opposite said plates, having a first set position and a second set position rotatably disposed from said first set position; and mechanical logic means, adapted to drive said set means to said first set positions when any said bistable element is in its true output stable position.

6. In a mechanical binary digital computer, an "or" gate as in claim 5 wherein said logic means comprise at least two first rods disposed opposite said plates, each of said first rods acting in cooperative relationship respectively with one of said plates; logic tabs, extending from each said plate, adapted to restrain said respective first rod of said plate from motion toward said plates when said respective plate is in its said false output position; spring means, continually urging said first rods toward said plates; and connecting means, connecting all of said first rods to said set rod and adapted to drive said set rod to said first set position when any rod of said first rods is not restrained by said logic tabs on its respective plate from motion toward said plates.

References Cited by the Examiner

UNITED STATES PATENTS

| | | | |
|---|---|---|---|
| 2,658,972 | 11/1953 | Brown. | |
| 2,973,898 | 3/1961 | Reynolds | 235—61 |
| 3,006,082 | 10/1961 | Libbey | 35—30 |
| 3,024,976 | 3/1962 | Wales | 235—61 |
| 3,057,551 | 10/1962 | Etter | 235—201 |
| 3,101,233 | 8/1963 | McNaney | 235—61 X |
| 3,116,014 | 12/1963 | Aymar | 235—61 |
| 3,118,309 | 1/1964 | Thompson | 235—61 |
| 3,133,358 | 5/1964 | Schramm | 235—61 X |
| 3,193,197 | 7/1965 | Bauer | 235—201 |
| 3,199,782 | 8/1965 | Shinn | 235—201 |

RICHARD B. WILKINSON, *Primary Examiner.*

LEO SMILOW, LOUIS J. CAPOZI, *Examiners.*

T. J. ANDERSON, *Assistant Examiner.*